Patented Oct. 15, 1940

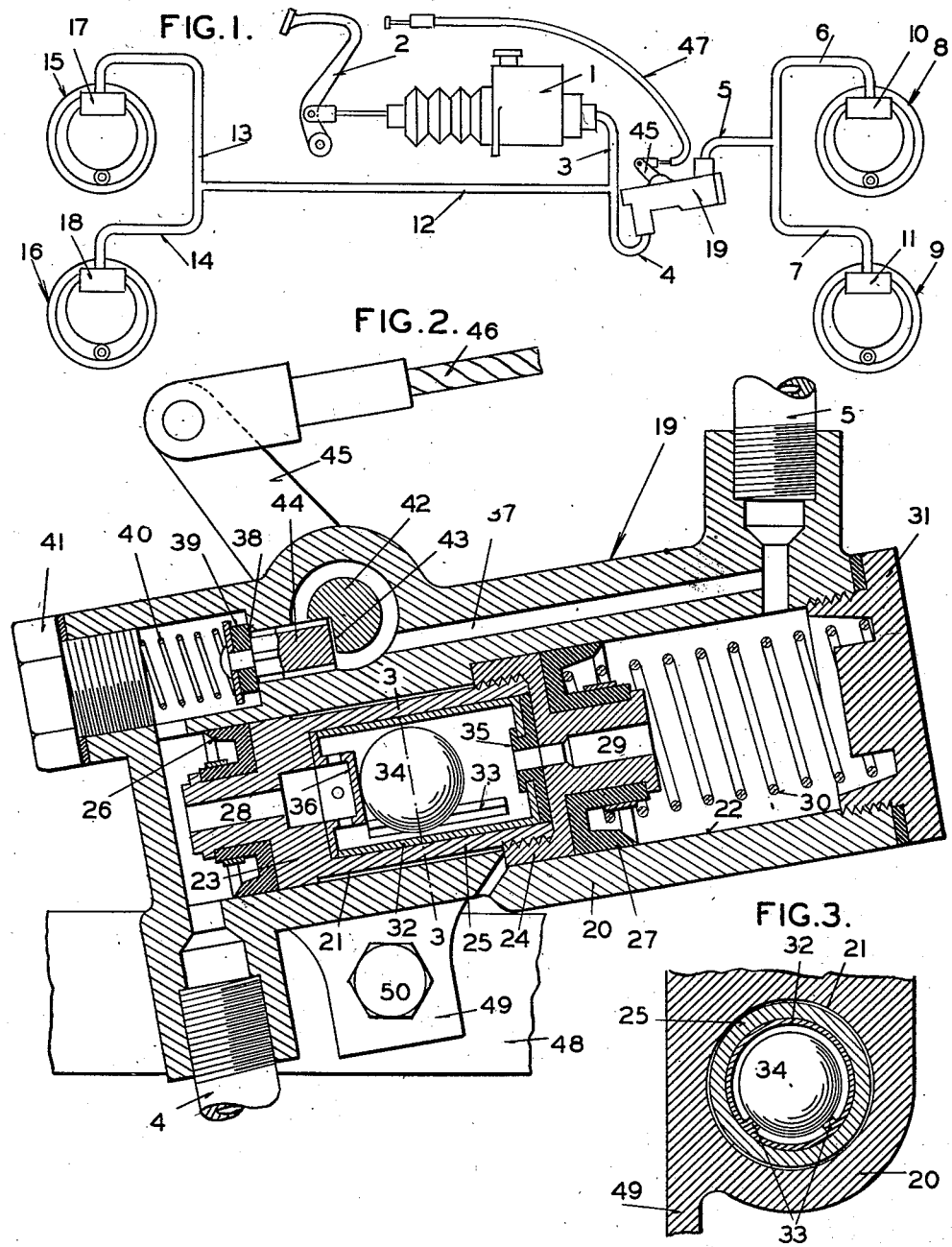

2,218,194

UNITED STATES PATENT OFFICE 2,218,194

MANUALLY CONTROLLED RATIO CHANGING DEVICE

Walter R. Freeman, University City, Mo., assignor to Wagner Electric Corporation, St. Louis, Mo., a corporation of Delaware Application September 2, 1939, Serial No. 293,179

11 Claims. (Cl. 188—152)

My invention relates to braking apparatus and more particularly to means for changing the ratio between the actuating pressures being applied to different brakes.

One of the objects of my invention is to provide an automatically-controlled means for changing the ratio between the actuating pressures being applied to different brakes which can be manually disabled by the operator.

Another and more specific object of my invention is to provide in a fluid pressure braking system an inertia-controlled device for causing the fluid pressure acting to actuate the front wheel brakes to be less than that acting to actuate the rear wheel brakes when the rate of deceleration is above a predetermined value and to also provide manually-controlled means for disabling the device.

Other objects of my invention will become apparent from the following description taken in connection with the accompanying drawing in which Figure 1 is a diagrammatic view of a fluid-actuated braking system having associated therewith a ratio changing device embodying my invention; Figure 2 is an enlarged longitudinal sectional view of the ratio changing device; and Figure 3 is a cross-sectional view taken on the line 3—3 of Figure 2.

Referring to the drawing in detail, numeral 1 indicates a master cylinder device and 2 a pedal for operating it to develop fluid pressure. The outlet of the master cylinder is connected by a conduit 3 and branch conduits 4, 5, 6 and 7 to the front wheel wheel brake assemblies 8 and 9, the brake shoes of which are actuated by fluid motors 10 and 11. The conduit 3 is also connected to branch conduits 12, 13 and 14 leading to the rear wheel brake assemblies 15 and 16, the brake shoes of which are actuated by fluid motors 17 and 18.

In accordance with my invention, I interpose between the conduits 4 and 5 leading to the front wheel brakes, an inertia-controlled ratio changing device 19 whereby the actuating fluid pressure in the fluid motors 10 and 11 may be caused to be different than that created by the master cylinder device when the rate of deceleration of the vehicle is greater than a predetermined value or the ratio changing device may be disabled and caused to be ineffective by operation of a manual member and notwithstanding the rate of deceleration is above said predetermined value.

As shown in detail in Figures 2 and 3, the ratio changing device and the manual control means therefor is embodied in a casing 20 provided with axially aligned stepped cylinders 21 and 22, the larger of which is connected to conduit 5 leading to the fluid motors of the front brakes and the smaller of which is connected to conduit 4 leading from the master cylinder. Within the small cylinder is a piston 23 and within the large cylinder is a piston 24 connected to the former by a cylindrical portion 25 carried by the small piston. Packing cups 26 and 27 prevent leakage past the pistons. The small piston is provided with a passage 28 and the large piston with a passage 29 which form with the cylindrical connecting portion 25 a by-pass passage through the pistons. The pistons are biased to one end of their cylinders, as shown in Figure 2, by a spring 30 interposed between the large piston and a closure plug 31.

Within the cylindrical portion is a cage 32 having ribs 33 forming a track upon which is positioned a rolling ball 34. This ball cooperates with an annular valve element 35 (made of rubber or like material) carried by the end of the cage so as to abut the end surface of passage 29 in the large piston. The ball, when engaged with the valve element, prevents flow of fluid through the pistons and in a direction toward the fluid motors of the front brakes. A perforated baffle 36 prevents fluid from impinging on the ball and also maintains the ball away from the passage 28 when it is in an inoperative position.

In addition to the ball controlled by-pass passage through the pistons there is provided in the casing 20 a by-pass passage 37 communicating with the outer ends of the cylinders and the conduits connected thereto. Associated with the passage is a valve seat 38 and cooperating therewith is a valve element 39 for closing the by-pass and preventing fluid from flowing therethrough from conduit 4 to conduit 5. The valve element 39 is normally held closed by a spring 40 interposed between said element and a plug 41. The valve 39 is adapted to be manually opened to permit fluid to flow freely through the by-pass, the structure shown to accomplish this comprising a shaft 42 journaled in the casing and provided with a shoulder 43 for engaging the fluted stem 44 of the valve element. The outer end of the shaft has secured thereto an arm 45 and connected thereto is a cable 46 of a Bowden wire control 47 which permits the arm to be operated from a remote point such as the operator's compartment of the vehicle.

The casing is mounted on a suitable support 48 by an attaching lug 49 and a bolt 50. In mounting the casing it is so positioned that the common axis of the cylinders is longitudinally disposed to the vehicle and inclined to the horizontal when the vehicle is positioned on a level roadway. The large cylinder is positioned toward the forward end of the vehicle so that the action of gravity will cause the ball to be disengaged from the valve element 35.

If the valve element 39 is closed and the brakes are applied, fluid under uniform pressure will be transmitted to all the fluid motors to apply the brakes. When the rate of deceleration becomes a predetermined value and the action of inertia is such as to cause the ball 34 to roll up the inclined track and engage valve element 35, the fluid motors for the front brakes will be cut off from the source of pressure. The fluid pressure from the source will now act on the small piston 23 to move both pistons forward in their cylinders. Since the piston 24 is larger than the piston 23, the fluid pressure created by it on the fluid in its cylinder and in the fluid motors of the front brakes will be less than the fluid pressure from the source which is also effective in the fluid motors of the rear brakes. Thus, when the ball-controlled valve closes, there will be a change in the rate of increase in fluid pressure in the front brake motors and the front brakes will be applied with less fluid pressure than the rear brakes. After the change-over takes place, the ratio between the fluid pressures effective on the front and rear brake fluid motors will be constant, such ratio depending upon the sizes of pistons 23 and 24.

When the master cylinder is released to release the brakes, fluid under pressure in the front brake motors will return to the master cylinder by either the passage through the two pistons or by way of the by-pass 37 (unseating valve 39) or both. The pistons will be returned by the spring 30 to their normal inoperative positions as shown in Figure 2.

When it is desired to disable the ratio changing device controlled by the rolling ball 34 and to have uniform pressure transmitted at all times and under all conditions to all the fluid motors of both sets of brakes, the valve element 39 is moved to open position by the Bowden wire control. This permits fluid to flow through the by-pass passage 37 in both directions regardless of the position of the ball. Thus the rate of deceleration of the vehicle when it is sufficient to move the ball to engage the valve element 35 will have no effect in changing the ratio between the fluid pressures in the front and rear fluid motors.

My inertia-operated ratio changing device with the manually-controlled disabling means is very useful in a braking system when operating a vehicle on wet or slippery highways. Under these conditions it is desirable to apply the front brakes with less pressure than the rear brakes as the braking action on the vehicle is increased in order to prevent locking of the front wheels and a resulting dangerous front wheel skid. By having the angle of inclination set quite small, the ratio changing device will become operative at a low rate of deceleration and thereafter the front wheel brakes will be applied with less pressure than the rear brakes. When it is not desired to use the ratio changing device on dry highways, it can be quickly disabled by opening valve element 39.

My device is also useful on heavy vehicles which when loaded have their greatest weight on the front wheels and when empty have substantially equal weight on all wheels or a greater weight on the rear wheels. Braking systems for such vehicles generally have larger fluid motors for the front brakes than the rear brakes in order to properly brake the vehicle under loaded conditions. With my device incorporated in such a brake, it can be disabled when the vehicle is loaded, thus permitting the brakes to function in the manner in which they were designed. When the vehicle is unloaded, the valve 39 can be closed, thereby causing the ratio changing device to be operative when the rate of deceleration is above a predetermined value. When the ratio device is operative, force with which the front brakes will be applied in comparison with the rear brakes will be reduced because the pressure in the front brake fluid motors will be less than in the rear brake fluid motors.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus for a vehicle, a plurality of brakes, a single means for actuating the brakes with uniform pressure, means associated with the actuating means and operable automatically in response to deceleration of the vehicle for causing a different actuating pressure to be effective on one of the brakes than on the other as the single means is operated and without decreasing the pressure already effective at the time said means becomes operable, and manually-controlled means for disabling said automatically operable means.

2. In braking apparatus for a vehicle, a plurality of brakes, fluid pressure actuating means for actuating the brakes and comprising a single source of fluid pressure connected to actuate all the brakes, means associated with the actuating means and operable automatically in response to deceleration of the vehicle for causing a different fluid pressure to be effective to actuate one of the brakes than that effective to actuate another of the brakes, and manually-controlled means for disabling said automatically operable means and permitting the brakes to be applied with equal fluid pressure under all conditions.

3. In fluid pressure braking apparatus for a vehicle, a plurality of brakes, means for actuating the brakes and comprising a single source of pressure, a fluid motor associated with each brake and conduit means for connecting said motors to the source of pressure to permit fluid under uniform pressure to be supplied to the motors, means associated with the conduit means between the source of pressure and at least one of the motors and operable automatically in response to deceleration of the vehicle for causing the fluid pressure being applied by the source to the motor to be increased at a different rate than the fluid pressure applied by said source to the motor of the other brake, and manually-controlled means for disabling said automatically operable means.

4. In fluid pressure braking apparatus for a vehicle, a plurality of brakes, means for actuating the brakes and comprising a source of pressure, a fluid motor associated with each brake and conduit means for connecting said motors to the source of pressure to permit fluid under uniform pressure to be supplied to the motors, means operable automatically when a predetermined rate of deceleration of the vehicle is attained for causing the fluid pressure being applied by the source to the motor of one of said brakes to be increased at a different rate than the fluid pressure applied by said source to the motor of the other brake, said means comprising ratio changing interconnected pistons and an inertia-controlled rolling ball for causing said pistons to be operative, and manually-controlled means for disabling said automatically operable means under all conditions.

5. In braking apparatus for a vehicle, front and rear brakes, means for actuating the brakes and comprising a source of pressure, a fluid motor associated with each brake and conduit means for connecting said motors to the source of pressure to permit equal pressure to be supplied to the motors, means associated with the conduit means leading to the front brake fluid motors for automatically causing the fluid pressure in the fluid motors of said front brakes to be less than the fluid pressure created by the source when the deceleration of the vehicle is greater than a predetermined value, said means comprising ratio changing interconnected pistons and an inertia-controlled ball for causing said pistons to be operative, and manually-controlled means for disabling said automatically operable means under all conditions and comprising a by-pass passage around the pistons, a valve for the passage and normally-operated means for opening the valve.

6. In braking apparatus for a vehicle, front and rear brakes, means for actuating the brakes and comprising a source of pressure, a fluid motor associated with each brake and conduit means for connecting said motors to the source of pressure to permit equal pressure to be supplied to the motors, means associated with the conduit means leading to the front brake fluid motors for automatically causing the fluid pressure in said motors to be less than the fluid pressure created by the source when the deceleration of the vehicle is greater than a predetermined value, said means comprising two cylinders of different diameters, the larger of which is connected to the conduit means leading to the front wheel fluid motors and the smaller of which is connected to the conduit means leading from the source of pressure, interconnected pistons in the cylinders, means forming a by-pass passage associated with the pistons, and inertia-controlled valve means for closing the valve means, and manually-controlled means for disabling said automatically operable means.

7. In braking apparatus for a vehicle, front and rear brakes, means for actuating the brakes and comprising a source of pressure, a fluid motor associated with each brake and conduit means for connecting said motors to the source of pressure to permit equal pressure to be supplied to the motors, means associated with the conduit means leading to the front brake fluid motors for automatically causing the fluid pressure in said motors to be less than the fluid pressure created by the source when the deceleration of the vehicle is greater than a predetermined value, said means comprising two cylinders of different diameters, the larger of which is connected to the conduit means leading to the front wheel fluid motors and the smaller of which is connected to the conduit means leading from the source of pressure, interconnected pistons in the cylinders, means forming a by-pass passage associated with the pistons, and inertia-controlled valve means for closing the valve means, means forming a second by-pass passage around said pistons, a valve for closing said second by-pass, and manually-controlled means for maintaining the valve open.

8. In fluid pressure apparatus for a vehicle, a source of fluid pressure, a fluid motor, a conduit connecting the source of pressure with the fluid motor, means associated with the conduit between the source and the motor and operable in response to deceleration of the vehicle for causing the fluid pressure in the fluid motor to be increased at a different rate than the fluid pressure supplied by said source, and manually-controlled means for causing said means to be ineffective.

9. In fluid pressure apparatus for a vehicle, a source of fluid pressure, a fluid motor, a conduit connecting the source of pressure with the fluid motor, means associated with the conduit and operable by a predetermined rate of deceleration of the vehicle for causing the fluid pressure in the fluid motor to be increased at a different rate than the fluid pressure supplied by said source, a by-pass around said means, and manually-controlled valve means for opening or closing said by-pass.

10. In fluid pressure apparatus for a vehicle, a source of fluid pressure, a fluid motor, a conduit connecting the source of pressure with the fluid motor, means associated with the conduit and operable by a predetermined rate of deceleration of the vehicle for causing the fluid pressure in the fluid motor to be increased at a different rate than the fluid pressure supplied by said source, said means comprising two interconnected pistons of different diameters, a by-pass for said pistons, and inertia-controlled means for closing the by-pass and causing the pistons to be operative, and manually-controlled means for disabling the first named means regardless of the rate of deceleration and comprising a second by-pass, a valve therefor and manual means for opening the valve.

11. In fluid pressure apparatus for a vehicle, a source of fluid pressure, a fluid motor, a conduit connecting the source of pressure with the fluid motor, means associated with the conduit and operable by a predetermined rate of deceleration of the vehicle for causing the fluid pressure in the fluid motor to be increased at a different rate than the fluid pressure supplied by said source, said means comprising two interconnected pistons of different diameters, a passage through the pistons, a valve element associated with the passage and a rolling ball mounted on an inclined track for cooperation with the valve element, a by-pass around the pistons, a valve for the by-pass, and manually-controlled means for opening the by-pass to thereby cause the first named means to be ineffective notwithstanding the rate of deceleration is such as to cause the ball to engage its cooperating valve element.

WALTER R. FREEMAN.